UNITED STATES PATENT OFFICE.

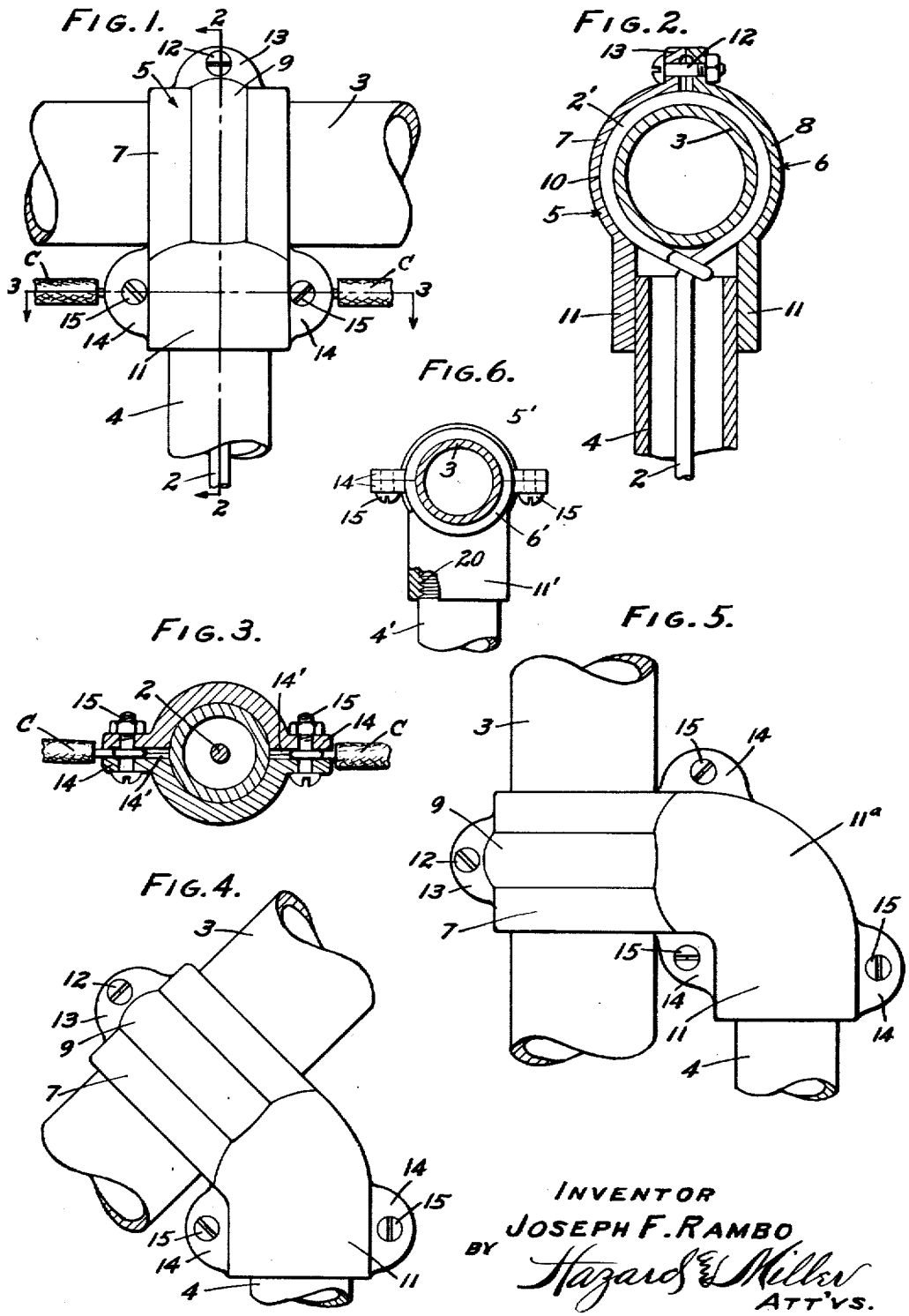

JOSEPH F. RAMBO, OF POMONA, CALIFORNIA, ASSIGNOR OF ONE-HALF TO ROBERT ANDREW SCHMITT, OF SAN DIEGO, CALIFORNIA.

CONDUIT COUPLING.

1,422,374.   Specification of Letters Patent.   Patented July 11, 1922.

Application filed April 29, 1920. Serial No. 377,518.

*To all whom it may concern:*

Be it known that I, JOSEPH F. RAMBO, a citizen of the United States, residing at Pomona, in the county of Los Angeles and State of California, have invented new and useful Improvements in Conduit Couplings, of which the following is a specification.

This invention relates to electrical apparatus and particularly to conduit connections, and has for its object to provide an improved coupling for the connection and support of a conduit or pipe to a gas, water or other convenient supporting part, and the invention consists of the construction, the combination and in details and arrangement of the parts, embodiments of which are illustrated in the accompanying drawings and described and claimed herein.

Figure 1 is a side elevation of a form of connection between relatively right angular parts.

Fig. 2 is a section on line 2—2 of Fig. 1.

Fig. 3 is a transverse section on line 3—3 of Fig. 1.

Fig. 4 is a side elevation of a 45° joint connector.

Fig. 5 is a side elevation of an elbow type of connector.

Fig. 6 is a transverse section through a modified form of the invention.

In the illustrated embodiment of the invention a ground wire 2 is shown as having one end looped or wrapped around a water, gas, or other ground pipe 3, and for the purpose of protecting the ground wire 2 it is incased in a conduit or pipe 4 which it is desired to securely support with relation to the stationary or fixed pipe 3.

To that end the invention consists of a conduit connector or coupling, preferably, made of separable sections in this case halves indicated at 5 and 6, these being right and left hand members. In Figs. 1 and 2 the connector halves are provided with semicylindrical portions 7 and 8 provided with an intermediate ridge or bead 9 and internally concaved to form an arcuate seat 10 embracing the loop 2' of the conductor wrapped around the pipe 3. The arcuate sections 5 and 6 of the connector are each shown as provided with a diametrically alined and laterally projecting extension indicated at 11, these to embrace the adjacent end of the conduit 4.

The sections 5 and 6 when assembled may be securely detachably locked as by a bolt 12 passing through overlapping ears or lugs 13 formed on one side of the sections 5 and 6, and on the opposite sides of the extensions 11 there may also be provided lugs or ears 14 through which may be passed fastening means as screws or bolts 15. Preferably the ears 14 are countersunk in their adjacent faces as at 14' to receive interposed terminals of other conductors indicated at C.

In Fig. 4 the connector is shown as of slightly modified form to connect a conduit 4 that is disposed obliquely to the length of the pipe 3. In Fig. 5 the connector is shown as of such shape as to provide for the connection of a conduit 4 extending parallel to the pipe 3. In this case the side extensions 11ª are shown as elbows of 90° bend.

In the modification of the invention illustrated in Fig. 6, the arcuate sections 5' and 6' meet in the plane of the axis of the pipe 3, the lower section 6' being provided with an extension 11' having threaded engagement with a conduit or pipe 4 as shown at 20. The arcuate sections are provided with lugs or ears 14 through which may be passed fastening means as screws or bolts 15.

It will be understood that this modified form of the invention may also be formed to connect a conduit 4 that is disposed obliquely to the length of the pipe 3, or which extends parallel to the pipe 3 by suitably bending the extension 11'.

From the above it will be seen that I have provided a simple, inexpensive, practicable, durable and readily attached and detached connector for effecting the connection of a conduit of a connecting ground line of a supporting and convenient pipe as 3.

Various changes may be made without departing from the spirit of my invention as claimed.

I claim:

1. The combination with an electrical conduit pipe inclosing a ground wire, of means for connecting said conduit in contiguous and fixed relation to a grounding pipe; said means comprising a sectional coupling attachable to the said conduit and the said pipe and having fastening devices for securing the parts assembled; the sections having interior seats to receive the ground conductor.

2. The combination with an electrical conduit pipe including a ground wire, of means for connecting said conduit in contiguous and fixed relation to a grounding pipe, said means comprising a sectional coupling attachable to the said conduit and the said pipe and having fastening devices for securing the parts of the sectional coupling and for attaching electrical conductor wires, the sections of the coupling having entire means for engaging the ground wire within the conduit pipe.

3. The combination with an electrical conduit pipe inclosing a ground wire, of means for connecting said conduit in contiguous and fixed relation to a grounding pipe, said means comprising a sectional coupling attachable to the said conduit and the said pipe and having fastening devices for securing the parts assembled, the sections of the coupling having means for engaging the ground wire.

In testimony whereof I have signed my name to this specification.

JOSEPH F. RAMBO.